(12) United States Patent
Egashira et al.

(10) Patent No.: US 8,106,115 B2
(45) Date of Patent: *Jan. 31, 2012

(54) GOLF BALL MATERIAL, GOLF BALL AND METHOD FOR PREPARING GOLF BALL MATERIAL

(75) Inventors: Yoshinori Egashira, Chichibu (JP); Eiji Takehana, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 265 days.

This patent is subject to a terminal disclaimer.

(21) Appl. No.: 12/390,112

(22) Filed: Feb. 20, 2009

(65) Prior Publication Data

US 2009/0221385 A1 Sep. 3, 2009

Related U.S. Application Data

(62) Division of application No. 11/195,743, filed on Aug. 3, 2005, now Pat. No. 7,514,505.

(30) Foreign Application Priority Data

Aug. 5, 2004 (JP) ................................ 2004-228901

(51) Int. Cl.
*A63B 37/12* (2006.01)
*A63B 37/00* (2006.01)
*C08L 33/02* (2006.01)
*C08L 9/00* (2006.01)

(52) U.S. Cl. ......... 523/351; 524/432; 525/78; 525/106; 525/119; 525/130; 525/154; 525/176; 525/183; 525/330.2; 473/373; 473/385

(58) Field of Classification Search .................... None
See application file for complete search history.

(56) References Cited

U.S. PATENT DOCUMENTS

| | | | |
|---|---|---|---|
| 3,741,926 A * | 6/1973 | Jurecic | ........................... 523/116 |
| 4,567,219 A * | 1/1986 | Tominaga et al. | ............ 524/413 |
| 4,774,290 A | 9/1988 | Neill et al. | |
| 4,990,574 A | 2/1991 | Yamada | |
| 5,068,151 A | 11/1991 | Nakamura | |
| 5,306,760 A | 4/1994 | Sullivan | |
| 5,312,857 A | 5/1994 | Sullivan | |
| 5,688,868 A * | 11/1997 | Fish, Jr. | .......................... 525/183 |
| 5,944,621 A | 8/1999 | Tsujinaka et al. | |
| 6,114,453 A | 9/2000 | Irii et al. | |
| 6,561,929 B2 | 5/2003 | Watanabe | |
| 7,393,289 B2 * | 7/2008 | Egashira et al. | .............. 473/351 |
| 7,514,505 B2 * | 4/2009 | Egashira et al. | .............. 525/196 |
| 7,635,730 B2 * | 12/2009 | Egashira et al. | .............. 523/351 |
| 7,803,874 B2 * | 9/2010 | Egashira et al. | .............. 525/126 |
| 2002/0045498 A1 | 4/2002 | Watanabe | |
| 2002/0090474 A1 | 7/2002 | Bean et al. | |
| 2003/0130061 A1 | 7/2003 | Rajagopalan et al. | |
| 2004/0044136 A1 | 3/2004 | Kim | |
| 2004/0067380 A1 | 4/2004 | Maeda et al. | |
| 2005/0079930 A1 | 4/2005 | Higuchi et al. | |
| 2007/0049419 A1 | 3/2007 | Egashira et al. | |
| 2009/0253534 A1 * | 10/2009 | Egashira et al. | .............. 473/372 |
| 2010/0009779 A1 * | 1/2010 | Egashira et al. | .............. 473/385 |

FOREIGN PATENT DOCUMENTS

| | | | |
|---|---|---|---|
| GB | 1148529 | | 4/1969 |
| JP | 04-061871 | | 2/1992 |
| JP | 06287223 | * | 10/1994 |
| JP | 10-179805 A | | 7/1998 |
| JP | 10-192447 A | | 7/1998 |
| JP | 2000-051402 | | 2/2000 |
| JP | 2002-065897 A | | 3/2002 |
| JP | 2002-126129 A | | 5/2002 |
| JP | 2002-200725 A | | 7/2002 |
| JP | 2002-355343 A | | 12/2002 |
| JP | 2004-091786 A | | 3/2004 |
| JP | 2004-352975 | | 12/2004 |
| WO | 98/46671 | | 10/1998 |

* cited by examiner

*Primary Examiner* — David Buttner
(74) *Attorney, Agent, or Firm* — Sughrue Mion, PLLC

(57) ABSTRACT

A golf ball material composed of (A) an oxygen-containing inorganic metal compound in the form of a particulate or a master batch capable of neutralizing at least some of the acid groups in an acid-containing polymer blend, (B) one or more polymer selected from among diene polymers, thermoplastic polymers and thermoset polymers, and (C) an acid-containing polymer is prepared by mixing component A in a blend of components B and C. The golf ball material has a good heat resistance, flowability and processability, and can be used to produce high-performance golf balls having durability, scuff resistance and optimal hardness without a loss of rebound.

16 Claims, No Drawings

GOLF BALL MATERIAL, GOLF BALL AND METHOD FOR PREPARING GOLF BALL MATERIAL

CROSS-REFERENCE TO RELATED APPLICATION

This application is a divisional of U.S. application Ser. No. 11/195,743, filed Aug. 3, 2005 now U.S. Pat. No. 7,514,505, which claims priority under 35 U.S.C. §119(a) on Patent Application No. 2004-228901 filed in Japan on Aug. 5, 2004. The entire disclosures of the prior applications are hereby incorporated by reference.

BACKGROUND OF THE INVENTION

1. Field of the Invention

The present invention relates to golf ball materials which have a good heat stability, flow and processability and from which there can be obtained high-performance golf balls endowed with excellent properties such as rebound and durability. The invention also relates to golf balls which include as an essential component therein a molding made from such a golf ball material, and to methods for preparing such golf ball materials.

2. Prior Art

In recent years, ionomer resins have been widely used in cover materials for golf balls. Ionomer resins are ionic copolymers of an olefin such as ethylene with an unsaturated carboxylic acid such as acrylic acid, methacrylic or maleic acid, in which some of the acid groups are neutralized with metal ions such as sodium, lithium, zinc or magnesium. These resins provide excellent characteristics in terms of durability, rebound and scuff resistance of the ball.

At present, the base resins used in cover materials for golf balls are generally ionomer resins, but a variety of modifications have been made to address the incessant desire by golfers for golf balls having a high rebound and an excellent flight performance.

For example, to improve the rebound and cost characteristics of ionomer cover materials, U.S. Pat. No. 5,312,857, U.S. Pat. No. 5,306,760 and International Application WO 98/46671 describe cover materials composed of an ionomer resin to which a large amount of a metallic soap has been added.

However, the metallic soap in these cover material undergoes decomposition and vaporization during injection molding, generating a large amount of fatty acid gas. As a result, molding defects tend to arise. Moreover, the gas that forms deposits on the surface of the molding, greatly lowering its paintability. The rebound characteristics obtained with these cover materials do not differ much from those provided by ionomer covers of the same hardness which contain no metallic soap; either the rebound in both cases is about the same or, at most, only a small positive effect is observable from the inclusion of a metallic soap. Hence, such inclusion does not markedly increase rebound. Moreover, depending on the type of metallic soap used, the processability and the rebound characteristics are sometimes greatly compromised, making the cover material entirely unfit for practical use.

An ionomer for use as a golf ball material has recently been developed in the form of a high rebound resilience material which is in a homogeneous phase and has an interpenetrating network (IPN) structure. The ionomer is obtained by mixing a first component such as an ethylene-(meth)acrylic acid copolymer with a different type of thermoplastic resin as a second component to form a resin composition, then adding a metal ionic species as a third component to neutralize the acid on the first component dispersed in the resin composition (U.S. Patent Application No. 2004/0044136). However, in this prior-art production method, because direct use is made of a solid (powder or granular material) such as a metal oxide, metal hydroxide or metal carbonate as the source of the metal ions, and also because a high acid content in the first component necessitates the addition of a large amount of the metal ions required for neutralizing the acid, during admixture of the metal ions, poor dispersion sometimes arises, leaving some of the metal ions unreacted. Moreover, a partial neutralization reaction (incomplete degree of neutralization) occurs, making it impossible to achieve the target degree of neutralization in a one-step reaction within an extruder. Hence, more than one extruder pass is made, which it is feared may lower the physical properties of the resulting ionomer material.

SUMMARY OF THE INVENTION

It is therefore an object of the invention, by having a metal ionic species bring to completion in one step a reaction which neutralizes the acid within an acid-containing polymer composition to a target degree of acid neutralization, to provide a golf ball material having a good heat stability, flow and processability from which can be obtained high-performance golf balls endowed with excellent properties such as durability, scuff resistance and optimal hardness without compromising rebound. Another object of the invention is to provide a golf ball which contains as an essential component a molding made from such a golf ball material. A further object of the invention is to provide a method for preparing such a golf ball material.

We have discovered that by using (A) a metal ionic species in the form of (A1) ultrafine particles and/or (A2) a master batch, and by blending this component A together with an acid-containing polymer blend composition prepared using a twin-screw reactor-extruder having a kneading disc zone to mix (B) at least one polymer selected from the group consisting of diene polymers, thermoplastic polymers and thermoset polymers with (C) at least one acid-containing polymer having an acid content of 0.5 to 30% by weight and selected from the group consisting of olefin-unsaturated carboxylic acid copolymers, olefin-unsaturated carboxylic acid-unsaturated carboxylic acid ester terpolymers, and polymers containing one or more monomer selected from the group consisting of unsaturated carboxylic anhydrides, unsaturated dicarboxylic acids and unsaturated dicarboxylic acid half esters, the neutralizing reaction by component A on acids in components B and C proceeds smoothly, yielding a uniform golf ball material in one step. Also, we have found that this golf ball material has a surprisingly good thermal stability, flow and processability, making it suitable for injection molding, and moreover is ideal for producing high-performance golf balls of excellent properties, including durability, scuff resistance and optimal hardness, without compromising the rebound of the material.

In addition, we have discovered that golf balls in which a molding made from this golf ball material is used as an essential component, such as a cover material in a two-piece solid golf ball composed of a cover and a cover enclosing the core or a cover material or intermediate layer material in a multi-piece solid golf ball composed of a core of at least one layer, at least one intermediate layer enclosing the core and at least one cover which encloses the intermediate layer, exhibit an excellent durability, excellent scuff resistance and optimal hardness without a loss of rebound.

Accordingly, the present invention provides a golf ball material comprising; (A) a metal ionic species in at least one form selected from the group consisting of (A1) ultrafine particles and (A2) a master batch, (B) at least one polymer selected from the group consisting of diene polymers, thermoplastic polymers and thermoset polymers, and (C) at least one acid-containing polymer having an acid content of 0.5 to 30% by weight and selected from the group consisting of olefin-unsaturated carboxylic acid copolymers, olefin-unsaturated carboxylic acid-unsaturated carboxylic acid ester terpolymers, and polymers containing one or more monomer selected from the group consisting of unsaturated carboxylic anhydrides, unsaturated dicarboxylic acids and half esters thereof; which is obtained by preparing a polymer blend of component B and component C, then blending component A together with the polymer blend.

In the golf ball material of the invention, component B is preferably at least one polymer selected from the group consisting of polyolefin elastomers, polystyrene elastomers, polyacrylate polymers, polyamide elastomers, polyurethane elastomers, polyester elastomers, diene polymers, polyacetals, epoxy resins, unsaturated polyester resins, silicone resins and ABS resins.

In a preferred aspect of the golf ball material of the invention, component B and component C are blended together in a weight ratio B/C of 99/1 to 1/99.

In another preferred aspect of the inventive golf ball material, component B is a thermoset polymer, and components B and C are blended together in a weight ratio B/C of 49/51 to 1/99.

In the inventive golf ball material, component B is a polybutadiene having a cis-1,4 bond content of at least 60%, a 1,2-vinyl bond content of at most 4%, a Mooney viscosity ($ML_{1+4}$ (100° C.)) of 35 to 65, a weight-average molecular weight (Mw) of 450,000 to 850,000, and a weight-average molecular weight (Mw) to number-average molecular weight (Mn) ratio of at most 5. The polybutadiene may be used itself or in a composition of an acid anhydride and a radical crosslinking agent.

In preferred aspects of the golf ball material of the invention, component B may be a polybutadiene and comprises between 1 to 50% by weight of the combined weight of component B and component C in the polymer blend; component B may be a polyacetal homopolymer or copolymer or both having an impact strength of 35 to 130 J/m and a flexural modulus of 2.50 to 3.10 GPa; and component B may be a polyacetal and comprises between 1 to 50% by weight of the combined weight of component B and component C in the polymer blend.

In the inventive golf ball material, it is preferable for component A1 or component A2 or both to be blended together with the polymer blend of component B and component C in an amount equivalent to a desired degree of neutralization of the acid groups in the polymer blend of components B and C.

In a preferred aspect of the inventive golf ball material, the metal ionic species of component A is in the form of (A1) ultrafine particles of an oxygen-containing inorganic metal compound having an average size of 0.005 to 0.1 μm and a particle size distribution of 0.001 to 1.0 μm in diameter. The particulate oxygen-containing inorganic metal compound (A1) is at least one type selected from the group consisting of lithium carbonate, sodium carbonate, potassium carbonate, magnesium carbonate, calcium carbonate, magnesium oxide, zinc oxide and calcium oxide.

In another preferred aspect of the inventive golf ball material, the metal ionic species of component A is in the form of (A2) a master batch of an oxygen-containing inorganic metal compound having an average particle size of 0.005 to 50 μm and a particle size distribution of 0.001 to 300 μm in diameter. The oxygen-containing inorganic metal compound in this preferred aspect is preferably at least one selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide. The oxygen-containing inorganic metal compound master batch A2 preferably comprises a base polymer material having a melt flow rate of at least 10 g/10 min and the oxygen-containing inorganic metal compound in an amount of 20 to 80% by weight of the combined weight of the base polymer material and the oxygen-containing inorganic metal compound, is prepared at a mixing temperature of 50 to 220° C. using an internal mixer such as a forced feeder-attached twin-screw/single-screw extruder in combination with a compression kneader, a tandem-type extruder, and a vent port attached twin-screw extruder.

The present invention also provides a method for preparing a golf ball material composed of (A) a metal ionic species in the form of one or both (A1) ultrafine particles and (A2) a master batch, (B) at least one polymer selected from the group consisting of diene polymers, thermoplastic polymers and thermoset polymers, and (C) at least one acid-containing polymer having an acid content of 0.5 to 30% by weight, selected from the group consisting of olefin-unsaturated carboxylic acid copolymers, olefin-unsaturated carboxylic acid-unsaturated carboxylic acid ester terpolymers, and polymers containing one or more monomer selected from the group consisting of unsaturated carboxylic anhydrides, unsaturated dicarboxylic acids and half esters thereof, which comprises the steps of: (a) preparing a polymer blend of component B and component C; and (b) using component A1 or component A2 or both components A1 and A2 to carry out in one step a neutralization reaction on the acid groups contained in the polymer blend of components B and C.

In a preferred aspect of the method of the invention, the neutralization reaction of the acid-containing polymer blend with component A1 or component A2 or both is carried out in one step by a reaction extruder such as a twin-screw extruder having a screw segment configuration a kneading disc zone. The twin-screw extruder has a length-to-diameter (LD) ratio of at least 20, and the screw segment configuration has the kneading disc zone of an L/D ratio of 10 to 90% of the total L/D ratio. It is desirable that the discs of the kneading disc zone of the twin-screw extruder include right-handed kneading discs, left-handed kneading discs, reverse discs, and various neutral discs, it is preferable that the twin-screw extruder has a screw diameter of at least 15 mm, and has a vent port and a vacuum line connected thereto.

In another preferred aspect of the inventive method, the twin-screw extruder may be equipped with a device such as a liquid-dropping apparatus or a pressurized liquid injection pump. The liquid is preferably a chemical shown by the formula ROH, where R is hydrogen or an alkyl group, and is added in an amount of 0.1 to 10% by weight, based on the resin extrusion output.

In the method of the invention, it is preferable that the neutralization reaction in the twin-screw extruder is carried out at a setting temperature of 110 to 260° C., an extrusion output, for a screw diameter (D) of 32 mm, of 2 to 60 kg/h, if the screw diameter ratio $D_1/D_2$ ($D_1$ being larger than $D_2$) is A, the extrusion output on the basis of scale-up of the twin-screw extruder is proportional to A within a range of $A^{1.0}$ to $A^{3.0}$.

The invention additionally provides a golf ball comprising a part made of the golf ball material of the invention.

The invention provides as well a golf ball wherein the above inventive golf ball material is used as a cover material in a two-piece solid golf ball composed of a cover and a cover surrounding the core.

The invention further provides a golf ball wherein the above inventive golf ball material is used as a cover material or intermediate layer material in a multi-piece solid golf ball composed of a core of at least one layer, at least one intermediate layer surrounding the core, and at least one cover surrounding the intermediate layer.

The golf ball materials of the invention and the inventive methods for preparing such golf ball materials enable the reaction in which acids within the acid-containing polymer are neutralized to be brought to completion. These golf ball materials thus have a good thermal stability, flow and processability. Moreover, they make it possible to obtain high-performance golf balls which are endowed with excellent properties, including durability, scuff resistance and optimal hardness, without compromising rebound.

DETAILED DESCRIPTION OF THE INVENTION

The invention is a golf ball material characterized by blending together (A) a finely divided metal ionic species, (B) at least one polymer selected from the group consisting of diene polymers, thermoplastic polymers and thermoset polymers, and (C) at least one acid-containing polymer selected from the group consisting of olefin-unsaturated carboxylic acid copolymers, olefin-unsaturated carboxylic acid-unsaturated carboxylic acid ester terpolymers, and polymers containing one or more monomer selected from the group consisting of unsaturated carboxylic anhydrides, unsaturated dicarboxylic acids and unsaturated dicarboxylic acid half esters; which golf ball material is obtained by preparing a polymer blend of component B and component C, then blending component A together with the polymer blend.

In the practice of the invention, to avoid the thermal history of polymer materials obtained with multiple passes by bringing the neutralization reaction to the target degree of neutralization in one step and thus prepare a better golf ball material, an oxygen-containing inorganic compound in the form of ultrafine particles (A1) is selected as the metal ionic species (A) used.

The ultrafine particles (A1) used in the invention preferably have an average particle size of from 0.005 to 0.1 µm and a particle size distribution of 0.001 to 1.0 µm. Compared with ordinary particles several tens of microns in size, such fine particles have a high surface activity, a good reactivity with acids and a good dispersibility, making them highly suitable for the neutralization reaction of the invention.

The metal ionic species (A) may be any suitable oxygen-containing inorganic compound that has previously been used. Generally, when the neutralization reaction on acids in the acid-containing polymer composition is carried out using the oxygen-containing inorganic compound directly as is, the unreacted oxygen-containing inorganic compound forms into and remains as undispersed masses, requiring multiple passes through an extruder to bring the neutralization reaction to the target degree of neutralization. To illustrate, U.S. Patent Application No. 2004/0044136 describes an example in which magnesium hydroxide is used as the metal ionic species and the acid-containing polymer is passed several times through a twin-screw extruder for neutralization.

The ultrafine particulate oxygen-containing inorganic compound (A1) used as the metal ionic species (A) is preferably selected from among metal oxides, metal carbonates and metal hydroxides having a low moisture absorption. The metal ionic species (A) is generally selected from among groups IA, IB, IIA, IIB, IIIA, IIIB, IVA, IVB, VA, VB, VIA, VIIB, VIIB and VIIIB of the periodic table. Specific, non-limiting, examples of the ultrafine particulate oxygen-containing inorganic compound (A1) include lithium carbonate, sodium carbonate, potassium carbonate, magnesium carbonate, calcium carbonate, magnesium oxide, zinc oxide, calcium oxide and magnesium hydroxide. These may be used singly or as combinations of two or more thereof. The use of these ultrafine particulate oxygen-containing inorganic compounds (A1) in a reaction to neutralize the acid within the acid-containing polymer composition provides such advantages as (i) inducing the reaction to proceed smoothly (because it exhibits a high neutralizing reactivity with acid groups), and (ii) a lower manufacturing equipment corrosiveness than metal acetates (which release acetic acid after neutralization).

Alternatively, the metal ionic species (A) can be used in the form of a master batch (A2) prepared from the oxygen-containing inorganic compound, in which case the (A2) component may be used in place of or in combination with the above-described ultrafine particulate oxygen-containing inorganic compound (A1). The oxygen-containing inorganic metal compound used to prepare the master batch has an average particle size of generally from 0.005 to 50 µm and a particle size distribution of generally 0.001 to 300 µm. The average particle size need not be as small as that of the ultrafine particulate oxygen-containing inorganic compound described above. However, if the average particle size is too large, the neutralization reaction may not reach completion. On the other hand, if the average particle size is too small, poor dispersion may occur during master batch preparation. As used herein, "average particle size" and "particle size distribution" refer to values obtained by particle size distribution measurement using a laser diffraction technique (laser diffraction/scattering).

By using the oxygen-containing inorganic compound in the form of a master batch (A2) (referred to below simply as "master batch (A2)"), the oxygen-containing inorganic metal compound can be uniformly dispersed in the reaction for neutralizing acids in components B and C of the acid-containing polymer blend, further promoting a uniform reaction and making it possible to impart uniformity to the golf ball material. On the other hand, if the oxygen-containing inorganic metal compound is not prepared as a master batch and is instead directly blended into components B and C of the above polymer blend, the oxygen-containing inorganic metal compound may be difficult to uniformly disperse in the polymer composition and may form undispersed masses, resulting in a non-uniform reaction, which may in turn lead to poor uniformity of the golf ball material. In particular, if an oxygen-containing inorganic metal compound in the form of a coarse powder is used, undispersed masses will remain in the golf ball material. It is also possible to promote the reaction and obtain a uniform material by preferentially preparing a master batch of an organic acid-free oxygen-containing inorganic metal compound which does not release organic acid following the neutralization reaction.

When a master batch (A2) is used, the metal ionic species included therein is a metal oxide, metal carbonate or metal hydroxide. The metal ion is selected from among groups IA, IB, IIA, IIB, IIIA, IIIB, IVA, IVB, VA, VB, VIIA, VIIB, VIIB and VIIIB of the periodic table. Specific, non-limiting, examples include lithium carbonate, sodium carbonate, potassium carbonate, magnesium carbonate, zinc carbonate, magnesium hydroxide, magnesium oxide, calcium hydroxide, calcium oxide and zinc oxide. These may be used singly or as combinations of two or more thereof.

The concentration of the above oxygen-containing inorganic metal compound is generally 10 to 90 wt %, preferably 20 to 80 wt %, and more preferably 30 to 70 wt %. If the concentration of oxygen-containing inorganic metal compound in the master batch (A2) is too high, the master batch may have a melt flow rate (MFR) of less than 0.1 g/10 min, which is too low. In such a case, blending the master batch together with components B and C may be detrimental to dispersion of the oxygen-containing inorganic metal compound within the master batch. On the other hand, if the concentration is low, a larger amount of the master batch will be added, allowing the influence of the high MFR base polymer used in the master batch (particularly ethylene waxes and low-acid content, high-MFR ethylene polymers, etc.) to emerge, which may markedly diminish the physical properties of the golf ball material.

The base polymer material used in the master batch (A2) is preferably one having a high MFR. Specifically, the base polymer material is typically one having an MFR of preferably at least 10 g/10 min, more preferably at least 50 g/10 min, and even more preferably at least 100 g/10 min. Use can also be made of a liquid wax such as a high-MFR ethylene wax, or a low-acid, high-MFR ethylene polymer. Specific examples include Polyethylene Wax AC5120 (available from Tomen Plastics Corporation; acrylic acid content, 15 wt %; MFR, >1,000 g/10 min), Nucrel 599 (available from DuPont; methacrylic acid content, 10 wt %; MFR, 450 g/10 min), Nucrel 699 (available from DuPont; methacrylic acid content, 11 wt %; MFR, 100 g/10 min), and Nucrel $NO_{200}H$ (available from DuPont-Mitsui Polychemicals Co., Ltd.; methacrylic acid content, 2 wt %; MFR, 130 g/10 min).

The inventive method of preparing a golf ball material is a process in which a reaction to neutralize the acid in an acid-containing polymer blend of at least two different polymers, i.e., component B and component C, is carried out in one step with a metal ionic species (A). To carry out the neutralization reaction in this single step, an extruder for neutralization, and in particular a twin-screw extruder having arranged therein a screw segment with a kneading disc zone, is employed so as to blend in the metal ionic species (A).

The amount of the metal ionic species (A) incorporated is necessarily determined by the target degree of neutralization of the acid groups present in the acid-containing polymer blend of components B and C. Too much may result in an excessive degree of neutralization, lowering the melt flow rate (MFR) of the golf ball material and compromising the processability. On the other hand, too little may diminish the physical properties of the golf ball material and compromise the rebound resilience and durability of golf balls obtained using the material.

The method of preparing the master batch (A2) may involve the use of an apparatus selected from among twin-screw/single-screw extruders (including kneader-extruders) equipped with a kneader such as a pressure kneader and a force feeder, tandem extruders (consisting of a twin-screw extruder for upstream processing and a vacuum-vented extruder for downstream processing), and vacuum-vented twin-screw extruders. It is more preferable either to use a twin-screw/single-screw extruder equipped with a kneader and a force feeder or to use a tandem extruder. Using this equipment, a dry blend of the oxygen-containing inorganic compound and the base polymer material is fed to a hopper and mixed, then pelletized to give a master batch (A2) having a melt flow rate in a range of 0.1 to 100 g/min. Alternatively, the oxygen-containing inorganic compound and the base polymer material may each be fed to separate feeders then mixed. The master batch mixing temperature is adjusted within a range of 50 to 220° C., and preferably 80 to 180° C.

The golf ball material of the invention can be obtained by mixing the various above components using, for example, an internal mixer such as a kneading-type twin-screw extruder, a Banbury mixer, a kneader or a Labo Plastomill (made by Toyo Seiki Seisaku-Sho, Ltd.). The extruder used for preparing the material is preferably a twin-screw extruder. A twin-screw extruder having features (i) to (v) below is especially preferred.

(i) An effective screw length L/D (i.e., screw length-to-diameter ratio) of at least 20, preferably at least 25, and more preferably at least 30.

(ii) A screw segment arrangement such that the L/D ratio of the kneading disc zone is 10 to 90%, preferably 20 to 80%, and more preferably 30 to 70%, of the overall L/D. Also, the discs in the kneading disc zone of the twin-screw extruder include a right-handed kneading disc, a left-handed kneading disc, a reverse disc, and various neutral discs.

(iii) A screw diameter of at least 15 mm.

(iv) Includes a vent port and a vacuum line connected thereto.

(v) Equipped with a device for the dropwise addition or pressurized injection of a liquid.

In the one-step neutralization reaction carried out in the method of the invention, above components B and C are melt-mixed to form a molten polymer composition of components B and C. Next, above-described component A (i.e., component A1 and/or component A2) is blended into the molten polymer composition, and a liquid may also be added (by injection under pressure or by dropwise addition) to promote a reaction in which at least some of the acid groups present in components B and C of the polymer composition are neutralized. The liquid in this case is preferably a compound of the formula ROH, where R represents a hydrogen or an alkyl group. The amount of this liquid added, based on the overall resin extrusion rate, is preferably 0.1 to 10 wt %, more preferably 0.5 to 8 wt %, and even more preferably 1.0 to 5.0 wt %.

The heating conditions can be set to, for example, 100 to 250° C., although melt-mixing is preferably carried out at a temperature which exceeds both the melting point of component B and the melting point of component C.

Although the mixing method is not subject to any particular limitation, for better microdispersion of component A it is preferable to first thoroughly melt-mix components B and C so as to form a polymer composition of components B and C, then to blend and mix in component A (i.e., component A1 and/or component A2). If additives are to be included, the additives may be added and mixed into the composition following the incorporation of component A.

In the practice of the invention, the acid neutralizing reaction on components B and C of the acid-containing polymer composition by the oxygen-containing inorganic metal compound A1 and/or A2 is carried out in one step. The neutralization reaction in the twin-screw extruder used for this purpose is carried out at a temperature setting of 110 to 260° C., preferably 130 to 240° C., and more preferably 170 to 230° C. The extrusion rate for a screw diameter D of 32 mm is 2 to 60 kg/h, preferably 5 to 50 kg/h, and more preferably 10 to 40 kg/h. Moreover, if the screw diameter ratio $D_1/D_2$ ($D_1$ being larger than $D_2$) is A, the extrusion rate during scale-up of the twin-screw extruder is proportional to A within a range of preferably $A^{1.0}$ to $A^{3.0}$, and more preferably $A^{1.5}$ to $A^{2.7}$.

It is preferable to provide the golf ball material of the invention with a melt flow rate (MFR) within a specific range so as to ensure that it has flow properties which are particularly suitable for injection molding and to improve its processability. Hence, the melt flow rate is generally at least 0.1 g/10 min, and preferably at least 0.5 g/10 min, but generally not more than 50 g/10 min, and preferably not more than 30 g/10 min. A melt flow rate which is too large or too small may significantly reduce the processability. As used herein, "melt flow rate" refers to a measured value obtained in accordance with JIS-K7210 at a test temperature of 190° C. and a test load of 21.18N (2.16 kgf).

The golf ball material of the invention has, in Fourier transform infrared absorption spectroscopic (FT-IR) measurements, an absorption peak attributable to carbonyl stretching vibrations at 1690 to 1710 cm$^{-1}$ and an absorption peak attributable to the carboxylate anion stretching vibrations of a metal carboxylate at 1530 to 1630 cm$^{-1}$, confirming the neutralization reaction and the presence of ionic crosslinks.

Moldings obtained using the golf ball material of the invention have a Shore D hardness of generally at least 50, and preferably at least 52, but generally not more than 75, and preferably not more than 70. If the molding has too high a Shore D hardness, the "feel" of the ball when hit may diminish significantly. On the other hand, if the Shore D hardness is too low, the rebound of the ball may decrease.

Component B in the invention is one or more polymer selected from the group consisting of diene polymers, thermoplastic polymers and thermoset polymers. Examples include polymers and polymer compositions composed of one or more selected from the group consisting of polyolefin elastomers, polystyrene elastomers, polyacrylate polymers, polyamide elastomers, polyurethane elastomers, polyester elastomers, diene polymers, polyacetals, epoxy resins, unsaturated polyester resins, silicone resins and ABS resins.

If above component B is a diene polymer, polybutadiene is especially preferred. This polybutadiene preferably has a cis-1,4 bond content of at least 60%, a 1,2-vinyl bond content of not more than 4%, a Mooney viscosity (ML$_{1+4}$ (100° C.) of 35 to 65, a weight-average molecular weight (Mw) of 450,000 to 850,000, and a weight-average molecular weight (Mw) to number-average molecular weight (Mn) ratio of at most 5. Illustrative examples include polybutadienes prepared using a nickel catalyst and polybutadienes prepared using a lanthanide series catalyst, of which the latter is preferred.

The polybutadiene serving as component B may be used directly as is. Alternatively, it may be used as a butadiene-containing composition obtained by mixture with an acid anhydride and a radical generator such as a peroxide. In addition, component C and the butadiene-containing composition are mixed together, following which a neutralization reaction is carried out using the metal ionic species serving as component A (i.e., component A1 and/or component A2). In this way, at the same time that metal ion crosslinking is carried out, grafting of the acid anhydride occurs and a material having a homogeneous phase on account of the covalently bonded crosslinks on the polybutadiene can be obtained. In the use of the inventive golf ball material as an injection molding material, component C must serve as the matrix and so it is preferable for the ratio in which the polybutadiene as component B is blended, expressed as the weight ratio of component B to component C (B/C), to be set as appropriate within a range of 5/95 to 45/55. Even though the polybutadiene serving as component B is incorporated into the component C matrix, golf ball materials obtained by the neutralization reaction using component A have an excellent heat resistance.

If above component B is a polyacetal, it is preferable to use one or more polyacetal selected from the group consisting of polyacetal homopolymers and polyacetal copolymers having an impact strength (¼-inch notched, at 23° C., ASTM D256) of 35 to 130 J/m and a flexural modulus (ASTM D790) of 2.50 to 3.10 GPa.

Specific examples of polyacetal homopolymers include Tenac 5050 and Tenac 7010 (both available from Asahi Kasei Chemicals Corporation), and Delrin 500P (available from DuPont). Specific examples of polyacetal copolymers include Amilus S731 and Amilus S761 (both available from Toray Industries, Inc.), Duracon M140S (available from Polyplastics Co., Ltd.) and Tenac 7520 (available from Asahi Kasei Chemicals Corporation). Specific examples of comonomers that may be used in polyacetal copolymers include alkylene oxides such as ethylene oxide and 1,3-dioxolane.

The weight ratio of the polyacetal as component B to component C (B/C) is generally 50/50 to 1/99, and preferably 45/55 to 5/95. Too much polyacetal (B) may lower the compatibility of components B and C, in addition to which the overall composition may becomes brittle and the durability of golf balls obtained therewith may dramatically decrease.

Above component B is an essential ingredient for further enhancing specific gravity control (specific gravity, ≧1.0), fatigue resistance, dimensional stability, wear resistance, impact resistance, processability, and the "feel" when hit (i.e., suitable hardness and flexural modulus), and so polyacetal is preferred because it has excellent fatigue resistance, dimensional stability, wear resistance, impact resistance, flexural modulus, thermal stability and processability. Polyacetal is desirable also as a hardness-increasing material for imparting a higher hardness and, if it can be uniformly dispersed in component A, will provide an ionomer golf ball material of a high hardness at an acid content of about 10 to 15 wt %.

In the practice of the invention, when component B is a thermoset polymer, the weight ratio of components B and C (B/C) in the resulting acid-containing polymer composition is preferably adjusted within a range of 49/51 to 1/99.

Component C is preferably a polymer composition which has an acid content of 0.5 to 30 wt %, preferably 1.0 to 25 wt %, and is composed of one or more selected from the group consisting of olefin-unsaturated carboxylic acid copolymers, olefin-unsaturated carboxylic acid-unsaturated carboxylic acid ester terpolymers, and polymers containing one or more monomer selected from the group consisting of unsaturated carboxylic anhydrides, unsaturated dicarboxylic acids and unsaturated dicarboxylic acid half esters.

If component C is an olefin-unsaturated carboxylic acid bipolymer, the olefin is generally one having at least 2 carbons, but 8 or fewer carbons, and especially 6 or fewer carbons. Illustrative examples of such olefins include ethylene, propylene, butene, pentene, hexene, heptene and octene. Ethylene is especially preferred. Illustrative examples of the unsaturated carboxylic acid include acrylic acid, methacrylic acid, maleic acid, maleic anhydride, and fumaric acid. Acrylic acid and methacrylic acid are especially preferred.

If component C is an olefin-unsaturated carboxylic acid-unsaturated carboxylic acid ester terpolymer, the unsaturated carboxylic acid ester is preferably a lower alkyl ester of the above-mentioned unsaturated carboxylic acids, specific examples of which include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred.

If component C is selected from among polymers containing one or more monomer selected from the group consisting of unsaturated carboxylic anhydrides, unsaturated dicarboxylic acids and unsaturated dicarboxylic acid half esters, examples of the unsaturated carboxylic anhydride include maleic anhydride and itaconic anhydride, with maleic anhydride being especially preferred. Examples of the unsaturated dicarboxylic acid include maleic acid, fumaric acid and itaconic acid, and examples of the unsaturated dicarboxylic acid half ester include monoesters of the foregoing dicarboxylic acids, such as the monoethyl ester of maleic acid, the monomethyl ester of fumaric acid and the monoethyl ester of itaconic acid. The monoethyl ester of maleic acid is especially preferred.

Specific examples of above component C include unsaturated carboxylic anhydride, unsaturated dicarboxylic acid and/or unsaturated carboxylic acid-grafted polymers; unsaturated carboxylic anhydride, unsaturated dicarboxylic acid and/or unsaturated carboxylic acid-grafted olefin-unsaturated carboxylic acid polymers; unsaturated carboxylic anhydride, unsaturated dicarboxylic acid and/or unsaturated carboxylic acid-grafted olefin-unsaturated carboxylic acid ester polymers; unsaturated carboxylic anhydride, unsaturated dicarboxylic acid and/or unsaturated carboxylic acid-grafted olefin-unsaturated carboxylic acid-unsaturated carboxylic aid ester polymers; olefin-unsaturated carboxylic anhydride, unsaturated carboxylic acid ester polymers; olefin-unsaturated dicarboxylic acid-unsaturated carboxylic acid ester polymers; and olefin-unsaturated dicarboxylic acid half ester-unsaturated carboxylic acid ester polymers.

Each of the above materials can be obtained by using a known method for copolymerization and grafting. If the acid content within the copolymer is too low, the reactivity and strength (tensile strength at break) may decrease. If it is too high, the processability may decrease.

Specific examples of commercial products that may be used as component C include olefin-unsaturated carboxylic acid polymers such as Nucrel 960 and Nucrel 2806 (both products of DuPont), and ESCOR 5200, ESCOR 5100 and ESCOR 5000 (all products of Exxon-Mobil Chemical).

Specific examples of olefin-unsaturated carboxylic acid-unsaturated carboxylic acid ester polymers include Bynel 2002, Bynel 2014, Bynel 2022 and Bynel E403 (all products of DuPont), and ESCOR ATX325, ESCOR ATX320 and ESCOR ATX310 (all products of Exxon-Mobil Chemical).

Specific examples of unsaturated carboxylic anhydride polymers include MODIPER A8100, MODIPER A8200 and MODIPER A8400 (all products of NOR Corporation), and LOTADER 3200, LOTADER 3300, LOTADER 5500, LOTADER 6200, LOTADER 7500, LOTADER 8200 and LOTADER TX8030 (all products of ATOFINA).

Specific examples of commercial unsaturated carboxylic anhydride grafted polymers that may be used include Polybond 3009, Polybond 3200 and Royaltough 498 (all products of Uniroyal Chemical), ADOMER NF518 and ADOMER QE800 (both products of Mitsui Chemicals, Inc.), Bynel 2167, Bynel 2174, Bynel 4206, Bynel 4288, Bynel 50E561 and Bynel 50E571 (all products of DuPont), and Exxelor VA1801, Exxelor VA1803, Exxelor VA1840 and Exxelor P01020 (all products of Exxon-Mobil Chemical).

In addition, any additive suitable for the intended use may be included in the golf ball material of the invention. If the golf ball material of the invention is to be used as a cover material, additives such as pigments, dispersants, antioxidants, ultraviolet absorbers and light stabilizers may be included together with above components A to C. When these additives are included, the amount of addition thereof per 100 parts by weight of components A to C combined is generally at least 0.1 part by weight, and preferably at least 0.5 part by weight, but generally not more than 10 parts by weight, and preferably not more than 4 parts by weight.

The golf ball material of the invention has a specific gravity of generally at least 0.9, preferably at least 0.92, and more preferably at least 0.94, but generally not more than 1.3, preferably not more than 1.2, and more preferably not more than 1.05.

The golf ball of the invention is a golf ball which includes as an essential component therein a molding made from the inventive golf ball material. Moldings made from the above-described golf ball material may be used as part or all of the golf ball. Examples include the cover of thread-wound golf balls in which the cover has a single-layer structure or a multilayer structure of two or more layers; one-piece golf balls; the solid core or cover of two-piece solid golf balls; and the solid core, intermediate layer or cover of multi-piece solid golf balls such as three-piece solid golf balls. The inventive golf ball is not subject to any particular limitation, provide it is a golf ball which includes as an essential component therein a molding of the inventive golf ball material.

It is particularly advantageous for the golf ball material of the invention to be used as the cover material in a two-piece solid golf ball composed of a core and a cover which encloses the core, or as the cover material or intermediate layer material in a multi-piece solid golf ball composed of a core of at least one layer, at least one intermediate layer which encloses the core, and at least one cover which encloses the intermediate layer.

Two-piece solid golf balls with a butadiene rubber core and a cover injection-molded from the golf ball material prepared by the above-described method were fabricated and tested, from which it was found that golf balls having the following performance and effects can be obtained. The results indicated below were obtained by comparing the invention with, as a control, a golf ball in which the cover material was a melt mixture of a metal ion species-containing ionomer of the same degree of neutralization (equivalent to the resin composition of components A and C) with component B.

a) The cover surface had an excellent uniformity.
b) Excellent scuff resistance.
c) Excellent durability (number of shots).
d) High hardness.
e) Excellent heat resistance.
f) Partially interpenetrating network structure.

EXAMPLES

Examples are given below by way of illustration and not by way of limitation. The twin-screw extruder for neutralization used in the invention had a screw diameter of 32 mm, an overall L/D ratio of 41, and an L/D ratio for the kneading disc zone which was 40% of the overall L/D ratio.

Example 1

A 5-liter pressure kneader (manufactured by Naniwa Machinery Manufacturing Co., Ltd.; temperature setting, 100° C.) was employed. The base polymer for the master batch was A-C580/Nucrel 599 blended in a weight ratio of 30/70, and the zinc oxide designated below as ZnO-2 (average particle size, 0.6 µm) was used. The kneader was charged with a combined amount of 2.0 kg of the A-C580/Nucrel 599 and the ZnO-2 in a 50/50 ratio by weight, and mixing was carried out for 20 minutes under an applied pressure of 0.49 MPa at a rotor speed of 35 rpm and at mixing temperature controlled within a range of 120 to 130° C. The mixture was discharged as a strand from a 40 mm diameter twin-screw/single-screw extruder (Naniwa Machinery Manufacturing Co., Ltd.; temperature setting, 180° C.), passed through a cooling water bath and by an air knife, then was rendered into pellets by a pelletizer. The melt flow rate of the resulting ZnO-2 master batch having a ZnO-2 content of 50 wt % was 2.1 g/10 min (measured at 190° C. under a load of 2,160 g). This master batch is designated below as ZnO-2 MB.

A-C580: A polyethylene wax produced by Tomen Plastics Corporation. Acrylic acid content, 9.6 wt %; viscosity, 650 cps at 140° C.

Nucrel 599: An ethylene-methacrylic acid polymer produced by DuPont. Methacrylic acid content, 10 wt %; MFR, 450 g/10 min.

Example 2

A golf ball material was prepared using the components and proportions shown in Table 1. Aside from charging the 5-liter pressure kneader with a combined amount of 2.5 kg of BR01 and EMAA-1 in the indicated proportions and using a temperature setting of 80° C., operation of the kneader was carried out as in Example 1. The mixed material was then removed and, except for a temperature setting of 130° C., operation of a twin-screw/single-screw extruder was carried out in the same way as in Example 1. Pellets of the resulting BR01/EMAA-1 mixture and ZnO-1 were separately fed to the hopper of a twin-screw extruder (temperature setting, 160° C.) in the specific proportions indicated in Table 1. Melt mixing was then carried out at a screw speed of 70 rpm and an extrusion rate of 16 kg/h while using a pump for the pressurized injection of a liquid to inject water in an amount of 2 wt %, based on the resin extrusion rate, at an intermediate point along the twin-screw extruder, and while releasing volatiles through a vacuum vent. Next, the strand discharged from the extruder die was passed through a cooling water bath, then excess water was removed with an air knife, after which the strand was pelletized by a pelletizer, yielding a uniform composition. Pellets of the uniform, transparent composition thus obtained were used to form a 3 mm thick sheet having a length and width of 150 mm each in a hot press molding machine. The sheet was visually examined, and found to be free of ZnO-1 in unreacted form or as undispersed masses. The properties of the resulting golf ball material were then evaluated. The results are shown in Table 1.

Example 3

Aside from using the ZnO-2 MB prepared in Example 1 instead of ZnO-1, a uniform and transparent BR01/EMAA-1/ZnO-2 MB composition was obtained by repeating the operations in Example 2 using the proportions indicated in Table 1. Pellets of the resulting uniform, transparent composition were used to form a 3 mm thick sheet having a length and width of 150 mm each in a hot press molding machine. The sheet was visually examined, and found to be free of ZnO-2 in unreacted form or as undispersed masses. The properties of the resulting golf ball material were then evaluated. The results are shown in Table 1.

Comparative Example 1

Aside from using ZnO-2 instead of a ZnO-2 master batch, the same operations as in Example 2 were repeated using the proportions indicated in Table 1. Pellets of the resulting BR01/EMAA-1/ZnO-2 composition were used to form a 3 mm thick sheet having a length and width of 150 mm each in a hot press molding machine. The sheet was visually examined, confirming the presence of a large amount of unreacted ZnO-2 (white specks). The properties of the resulting golf ball material were then evaluated. The results are shown in Table 1.

TABLE 1

|  | Example 2 | Example 3 | Comparative Example 1 |
|---|---|---|---|
| BR01 | $10_{(2nd)}$ | $10_{(2nd)}$ | $10_{(2nd)}$ |
| EMAA-1 | $90_{(1st)}$ | $90_{(1st)}$ | $90_{(1st)}$ |
| ZnO-1 | $3_{(3rd)}$ | — | — |
| ZnO-2MB | — | $6_{(3rd)}$ | — |
| ZnO-2 | — | — | $3_{(3rd)}$ |
| MFR (g/10 min) | 21 | 24 | 170 |
| Hardness (Shore D), 23° C. | 52 | 52 | 40 |
| Rebound (%) $\theta_0 = 40°$ | 40 | 40 | 26 |
| $\theta_0 = 80°$ | 30 | 30 | 21 |
| UTS (MPa) | 17.5 | 17.9 | 11.2 |
| UTE (%) | 187 | 200 | 248 |
| Remarks | Transparent | | Translucent |

Amounts of components are given in parts by weight.
Numbers in parentheses ( ) indicate the mixing order.

The properties obtained with the use of ZnO-1 in Example 1 and with the use of ZnO-2 MB in Example 2 were substantially the same. Compared with these examples according to the invention, the properties with the use of ZnO-2 in the comparative example were inferior, and included a high MFR, a low hardness and a low rebound.

BR01: The polybutadiene BR01 produced by JSR Corporation; cis-1,4 bond content, 96%; nickel polymerization catalyst.

BR02: A product prepared by mixing 2 parts by weight of maleic anhydride with 100 parts by weight of BR01, then adding 1 part by weight of dicumyl peroxide per 100 parts by weight of the mixture and mixing at about 80° C. for 10 minutes.

ZnO-1: Available from Sakai Chemical Industry Co., Ltd. Nanofine-50, a zinc oxide having an average particle size of 20 nm and a particle size distribution of 1 to 100 nm. Proportion of component with particle size $\leq 0.05$ μm, about 60%.

ZnO-2: A type of zinc oxide produced by Sakai Chemical Industry Co., Ltd. Average particle size, 0.8 μm. Particle size distribution, 0.07 to 3.00 μm.

POM: Amilus S761, produced by Toray Corporation. MFR, 9.6 g/10 min; melting point, 166° C.; Rockwell hardness, R115.

EMAA-1: Nucrel 2050H, an ethylene-methacrylic acid copolymer produced by DuPont-Mitsui Polychemicals Co., Ltd. MFR, 500 g/10 min.

EMAA-2: Nucrel 1560, an ethylene-methacrylic acid copolymer produced by DuPont-Mitsui Polychemicals Co., Ltd. MFR, 60 g/10 min.

S8940: Sodium ionomer of an ethylene-methacrylic acid copolymer, produced by DuPont. MFR, 3.0 g/10 min.

MFR (g/10 min): The melt flow rate was measured in accordance with JIS-K7210 at a test temperature of 190° C. and a test load of 21.18 N (2.16 kgf).

Shore D Hardness: Measured in accordance with ASTM D-2240.

Rebound Resilience: A value measured in accordance with JIS-K6255 and ISO 4662 using a Tripson rebound resilience tester.

Elongation at Break (%) and Tensile Strength (MPa): Measured in accordance with JIS-K7161.

It is apparent from the above data that when the metal ionic species (ZnO-2) is added directly in the form of merely fine (rather than ultrafine) particles, neutralization of the acids within the acid-containing polymer cannot easily be brought to completion, and moreover that several passes through the extruder are required to bring the neutralization reaction to completion. These results confirm the importance of using a metal ionic species in the form of ultrafine particles (ZnO-1) or as a master batch (ZnO-2 MB). Methods for preparing the golf ball material using ZnO-1 and ZnO-2 MB and the properties of golf ball materials thus obtained are evaluated below.

Example 4

Aside from using BR02 instead of BR01 and changing the temperature setting of the twin-screw extruder from 160° C. to 180° C., a uniform BR02/EMAA-1/ZnO-1 mixed composition was obtained by formulating the components as shown in Table 2 and repeating the same operations as in Example 2. Pellets of the resulting uniform and transparent composition were used to form a 3 mm thick sheet having a length and width of 150 mm each in a hot press molding machine. The sheet was visually examined and found to be free of ZnO-1 in unreacted form or as undispersed masses. The properties of the resulting golf ball material were then evaluated. The results are shown in Table 2.

Example 5

POM and EMAA-1 were dry blended in the proportions shown in Table 2, fed to the hopper of the twin-screw extruder (temperature setting, 180° C.) used in Example 2, and melt-mixed at a screw speed of 80 rpm, an extrusion rate of 20 kg/h and with the release of volatiles through a vacuum vent. The strand discharged from the extruder die was passed through a cooling water bath, after which excess water was removed with an air knife, then the strand was pelletized by a pelletizer, yielding a uniform POM/EMAA-1 mixture. Aside from dry-blending this POM-EMAA-1 mixture with ZnO-2 MB in the proportions shown in Table 2 instead of a BR01/EMAA-1 mixture with ZnO-1, and changing the temperature setting from 160° C. to 190° C., the same twin-screw extruder operations as in Example 2 were repeated, giving a uniform POM/EMAA-1/ZnO-2 MB composition. Pellets of the resulting uniform and transparent composition were used to form a 3 mm thick sheet having a length and width of 150 mm each in a hot press molding machine. The sheet was visually examined and found to be free of Zno-2 in unreacted form or as undispersed masses. The properties of the resulting golf ball material were then evaluated. The results are shown in Table 2.

Example 6

Aside from using EMAA-2 instead of EMAA-1 and using ZnO-1 instead of ZnO-2 MB, a uniform POM/EMAA-2/ZnO-1 composition was obtained by formulating the components as shown in Table 2 and repeating the same operations as in Example 5. Pellets of the resulting uniform and transparent composition were used to form a 3 mm thick sheet having a length and width of 150 mm each in a hot press molding machine. The sheet was visually examined and found to be free of ZnO-2 in unreacted form or as undispersed masses. The properties of the resulting golf ball material were then evaluated. The results are shown in Table 2.

Example 7

The POM/EMAA-2/ZnO-1 composition obtained in Example 6 and S8940 were dry blended in the proportions shown in Table 2, fed to the hopper of the twin-screw extruder used in Example 2 (temperature setting, 190° C.), and melt-mixed at a screw speed of 80 rpm, an extrusion rate of 20 kg/h, and while releasing volatiles through a vacuum vent. The strand discharged from the extruder die was passed through a cooling water bath, after which excess water was removed with an air knife, then the strand was pelletized by a pelletizer, yielding a uniform POM/EMAA-2/ZnO-1/S8940 composition. The properties of the resulting golf ball material were then evaluated. The results are shown in Table 2.

Comparative Example 2

A uniform EMAA-1/ZnO-1 mixture in which a neutralization reaction had taken place between the EMAA-1 and ZnO-1 was obtained by extrusion in a twin-screw extruder under the same conditions as in Example 4 (temperature setting, 180° C.; pressurized injection of water). The resulting mixture was dry-blended with BR02 in the proportions shown in Table 2, then melt-mixed under the twin-screw extruder conditions for POM/EMAA-1 in Example 5 (temperature setting, 180° C.) and pelletized, yielding a non-uniform EMAA-1/ZnO-1/BR02 composition. The properties of the resulting golf ball material were then evaluated. The results are shown in Table 2.

Comparative Example 3

A uniform EMAA-1/ZnO-2 MB mixture in which a neutralization reaction had taken place between the EMAA-1 and ZnO-2 MB was obtained by extrusion in a twin-screw extruder under the same conditions as in Example 4 (temperature setting, 180° C.; pressurized injection of water). The resulting mixture was dry-blended with POM in the proportions shown in Table 2, then melt-mixed under the twin-screw extruder conditions in Example 7 (temperature setting, 190° C.) and pelletized, yielding a cloudy, non-uniform EMAA-1/ZnO-2 MB/POM composition. The properties of the resulting golf ball material were then evaluated. The results are shown in Table 2.

Comparative Example 4

A uniform EMAA-2/ZnO-1 mixture in which a neutralization reaction had taken place between the EMAA-2 and ZnO-1 was obtained by extrusion in a twin-screw extruder under the same conditions as in Example 4 (temperature setting, 180° C.; pressurized injection of water). The resulting mixture was dry-blended with POM in the proportions shown in Table 2, then melt-mixed under the twin-screw extruder conditions in Example 7 (temperature setting, 190° C.) and pelletized, yielding a cloudy, non-uniform EMAA-2/ZnO-1/POM composition. The properties of the resulting golf ball material were then evaluated. The results are shown in Table 2.

Comparative Example 5

The cloudy, non-uniform EMAA-2/ZnO-1/POM composition obtained in Comparative Example 4 was dry-blended with S8940 in the proportions indicated in Table 2, then melt-mixed under the twin-screw extruder conditions in Example 7 (temperature setting, 190° C.) and pelletized, yielding a cloudy, non-uniform EMAA-2/ZnO-1/POM/S8940 composition. The properties of the resulting golf ball material were then evaluated. The results are shown in Table 2.

Reference Example

Aside from not including the BR02 or POM used in the above examples, using EMAA-1 and ZnO-1 in the proportions shown in Table 2, and changing the temperature setting of the twin-screw extruder from 160° C. to 180° C., a uniform and transparent EMAA-1/ZnO-1 composition was obtained under the same extrusion conditions as in Example 2. The properties of the resulting golf ball material were evaluated.

butadiene rubber body (diameter, 38.9 mm; weight, 36.0 g; compressive strain, 3.35 mm) as the core, and using an injection molding machine (temperature settings: hopper, 160° C.; C1 to head, 180 to 200° C.), the cover material was injection molded over the core at a molding pressure of 5.9 MPa, a dwell pressure of 4.9 MPa, an injection and dwell time of 8 seconds, and a cooling time of 25 seconds, thereby producing

TABLE 2

|  | Example | | | | Comparative Example | | | | Reference Example |
| --- | --- | --- | --- | --- | --- | --- | --- | --- | --- |
|  | 4 | 5 | 6 | 7 | 2 | 3 | 4 | 5 |  |
| POM | — | $10_{(2nd)}$ | $10_{(2nd)}$ | $10_{(2nd)}$ | — | $10_{(3rd)}$ | $10_{(3rd)}$ | $10_{(3rd)}$ | — |
| S8940 | — | — | — | $100_{(4th)}$ | — | — | — | $100_{(4th)}$ | — |
| BR02 | $10_{(2nd)}$ | — | — | — | $10_{(3rd)}$ | — | — | — | — |
| EMAA-1 | $90_{(1st)}$ | $90_{(1st)}$ | — | — | $90_{(1st)}$ | $90_{(1st)}$ | — | — | 100 |
| EMAA-2 | — | — | $90_{(1st)}$ | $90_{(1st)}$ | — | — | $90_{(1st)}$ | $90_{(1st)}$ | — |
| ZnO-1 | $3_{(3rd)}$ | — | $3.8_{(3rd)}$ | $3.8_{(3rd)}$ | $3_{(2nd)}$ | — | $3.8_{(2nd)}$ | $3.8_{(2nd)}$ | $3_{(3rd)}$ |
| ZnO-2MB | — | $6_{(3rd)}$ | — | — | — | $6_{(2nd)}$ | — | — | — |
| MFR (g/10 min) | 9.0 | 29.6 | 2.4 | 2.6 | 20.4 | 26.5 | 1.7 | 2.1 | 40.9 |
| Hardness (Shore D), 23° C. | 54 | 66 | 66 | 66 | 41-53 | 64 | 64 | 65 | 62 |
| Rebound (%) $\theta_0 = 40°$ | 40 | 39 | 43 | — | 40 | 39 | 43 | — | 40 |
| $\theta_0 = 80°$ | 30 | 29 | 34 | — | 30 | 29 | 35 | — | 30 |
| UTS (MPa) | 18.9 | 19.0 | 27.8 | 33.0 | Broke | 18.5 | 27.5 | 31.8 | 21.2 |
| UTE (%) | 236 | 161 | 309 | 341 | Broke | 174 | 314 | 386 | 279 |
| Remarks |  | Transparent | | | | Cloudy, translucent | | | |

Amounts of components are given in parts by weight.
Numbers in parentheses ( ) indicate the mixing order.

On comparing the results obtained in Examples 4 to 7 with the results obtained in the respective corresponding Comparative Examples 2 to 5, it is apparent that the golf ball materials obtained in the examples according to the invention were uniform mixtures, and tended in each case to have a higher hardness and tensile strength. Also, when POM, which has a linear structure, was included, the inventive golf ball materials had a high melt flow rate and did not exhibit a loss of rebound resilience. Moreover, the inventive golf ball materials generally tended to have a higher hardness than the material obtained in the reference example.

Golf balls were produced using the above materials and evaluated to determine whether these characteristics are reflected in the performance of the golf ball.

Examples 8 to 10

Using the materials obtained in Examples 4, 6 and 7 as the cover materials in two-piece golf balls, using a crosslinked two-piece golf balls (diameter, 42.7 mm; weight, 45.5 g). These golf balls were then evaluated. The results are shown in Table 3.

Comparative Examples 6 to 8

These comparative examples correspond respectively to above Examples 8, 9 and 10. The golf ball materials prepared in Comparative Examples 2, 4 and 5 were used as the cover materials for two-piece golf balls, and two-piece golf balls were produced under the same injection molding conditions as in Examples 8 to 10. These golf balls were then evaluated. The results are shown in Table 3.

TABLE 3

|  | Example | | | Comparative Example | | |
| --- | --- | --- | --- | --- | --- | --- |
|  | 8 | 9 | 10 | 6 | 7 | 8 |
| Golf ball cover material | EX 4 material | EX 6 material | EX 7 material | CE 2 material | CE 4 material | CE 5 material |
| Deflection hardness (mm) *1 | 2.91 | 2.77 | 2.73 | 2.46 | 2.80 | 2.74 |
| GB facial hardness *2 | 64 | 70 | 70 | 59 | 70 | 70 |
| Initial velocity (m/s) *3    0° | 76.48 | 76.04 | 76.29 | 76.31 | 76.06 | 76.22 |
| 23° | 76.49 | 76.76 | 77.38 | 76.42 | 76.76 | 77.32 |
| 40° | 75.79 | 76.57 | 77.23 | 75.78 | 76.54 | 77.23 |
| C.O.R. *4 | 0.770 | 0.775 | 0.792 | 0.768 | 0.774 | 0.791 |
| Number of shots (Durability) *5 | 87 | 85 | 103 | 22 | 80 | 90 |

TABLE 3-continued

|  | Example | | | Comparative Example | | |
| --- | --- | --- | --- | --- | --- | --- |
|  | 8 | 9 | 10 | 6 | 7 | 8 |
| Scuff resistance, 23° C. *6 | Good | Good | Good | Poor | Poor | Good |
| Abrasion resistance (Sand) *7 | Good | Good | Good | Poor | Poor | Good |
| Remarks | Good heat resistance Good durability Good Uniformity | Good heat resistance | Good durability | Poor heat resistance Poor durability Poor Uniformity | Poor heat resistance | Poor durability |

*1 Deflection hardness
The amount of deflection by the spherical object being tested when subjected, on a hard plate, to an increase in load from an initial load state of 98 N (10 kgf) to a load of 1,275 N (130 kgf).
*2 GB facial hardness
Shore D hardness on the ball surface. The measurement was carried out using a type D durometer in accordance with ASTM-2240.
*3 Initial velocity
It is noted that the initial velocity was measured using the same type of initial velocity instrument as the USGA rotary drum initial velocity instrument approved by R&A. The ball was conditioned at a temperature of 23 ± 1° C. for at least 3 hours and tested in a chamber at room temperature of 23 ± 2° C. The ball was hit with a head having a striking mass of 250 pounds (113.4 kg) at a hitting speed of 143.8 ft/s (43.83 m/s). One dozen of balls were hit each four times, and the time of passage across a distance of 6.28 feet (1.91 m) was measured, from which the initial velocity was computed. This cycle was completed within about 15 minutes.
*4 C.O.R.
Coefficient of restitution (C.O.R.) was measured by firing a golf ball in an air cannon at a velocity of 43 m/sec against a steel plate. The rebound velocity was then measured. The rebound velocity was divided by the forward velocity to give a coefficient of restitution.
*5 Number of shots (Durability)
The durability of each golf ball was evaluated using an ADC Ball COR Durability Tester produced by Automated Design Corporation (U.S.). This tester has the ability to fire a golf ball using air pressure and cause it to repeatedly strike two metal plates arranged in parallel. The number of firings needed until a ball cracks was treated as the indicator of durability.
Velocity of impact with metal plate: 43 m/s
Number of runs (N): 7
Type: Horizontal COR
*6 Scuff resistance
After the balls were held at 23° C., they were normally hit for each ball by means of a swing robot equipped with a pitching wedge at a head speed of 33 m/s. The scuff by hit was observed and was evaluated according to the criterion below.
Good: None of scuff or slight scuff as not cared when the ball is used
Poor: fluff on ball surface or scuff as lack of dimples
*7 Abrasion resistance
15 golf balls with a 1.7-litter volume of sand were put in a 5-litter cylindrical container and laid down to turn round at a 50 rotation per minute speed for 2 hours. After the procedure, the golf balls were picked up and observed.

On comparing Example 8 with Comparative Example 6, Example 9 with Comparative Example 7, and Example 10 with Comparative Example 8, it is apparent that the golf balls obtained in the examples according to the invention had much better durability (number of shots), cut resistance, scuff or abrasion resistance, and heat resistance during injection molding. Moreover, the initial velocity and coefficient of restitution in each case remained about the same.

Japanese Patent Application No. 2004-228901 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball material comprising:
(A) a metal ionic species in a form of (A2) a master batch of an oxygen-containing inorganic metal compound having an average particle size of 0.005 to 50 μm and a particle size distribution of 0.001 to 300 μm in diameter,
(B) at least one polymer selected from the group consisting of 1,4-polybutadiene, polystyrene elastomers, polyacrylate polymers, polyurethane elastomers, polyester elastomers, polyacetals, epoxy resins, unsaturated polyester resins, silicone resins and ABS resins, and
(C) at least one acid-containing polymer having an acid content of 0.5 to 30% by weight and selected from the group consisting of olefin-unsaturated carboxylic acid copolymers, olefin-unsaturated carboxylic acid-unsaturated carboxylic acid ester terpolymers, and polymers containing one or more monomer selected from the group consisting of unsaturated carboxylic anhydrides, unsaturated dicarboxylic acids and half esters thereof, the component (C) being un-neutralized;
which is obtained by preparing a polymer blend of component B and component C, then blending component A together with the polymer blend.

2. The golf ball material of claim 1, wherein the average size of component A is from 0.005 to 0.8 μm.

3. The golf ball material of claim 1, wherein component B and component C are blended together in a weight ratio B/C of 99/1 to 1/99.

4. The golf ball material of claim 1, wherein component B is a thermoset polymer, and components B and C are blended together in a weight ratio B/C of 49/51 to 1/99.

5. The golf ball material of claim 1, wherein component B is a polybutadiene having a cis-1,4 bond content of at least 60%, a 1,2-vinyl bond content of at most 4%, a Mooney viscosity ($ML_{1+4}$ (100° C.)) of 35 to 65, a weight-average molecular weight (Mw) of 450,000 to 850,000, and a weight-average molecular weight (Mw) to number-average molecular weight (Mn) ratio of at most 5.

6. The golf ball material of claim 5, wherein the polybutadiene is used itself or in a composition of an acid anhydride and a radical crosslinking agent.

7. The golf ball material of claim 1, wherein component B is a polybutadiene and comprises between 1 to 50% by weight of the combined weight of component B and component C in the polymer blend.

8. The golf ball material of claim 1, wherein component B is a polyacetal homopolymer or copolymer or both having an impact strength of 35 to 130 J/m and a flexural modulus of 2.50 to 3.10 GPa.

9. The golf ball material of claim 1, wherein component B is a polyacetal and comprises between 1 to 50% by weight of the combined weight of component B and component C in the polymer blend.

10. The golf ball material of claim 1, wherein component A2 is blended together with the polymer blend of component B and component C in an amount equivalent to a desired degree of neutralization of the acid groups in the polymer blend of components B and C.

11. The golf ball material of claim 1, wherein the oxygen-containing inorganic metal compound is at least one selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide.

12. The golf ball material of claim 1, wherein the oxygen-containing inorganic metal compound master batch A2 comprises a base polymer material having a melt flow rate of at least 10 g/10 min and the oxygen-containing inorganic metal compound, wherein the oxygen-containing inorganic metal compound is in an amount of 20 to 80% by weight of the combined weight of the base polymer material and the oxygen-containing inorganic metal compound.

13. The golf ball material of claim 1, wherein the oxygen-containing inorganic metal compound master batch A2 is prepared at a mixing temperature of 50 to 220° C. using an internal mixer.

14. A golf ball comprising a part made of the golf ball material of claim 1.

15. A golf ball wherein the golf ball material of claim 1 is used as a cover material in a two-piece solid golf ball composed of a core and a cover surrounding the core.

16. A golf ball wherein the golf ball material of claim 1 is used as a cover material or an intermediate layer material in a multi-piece solid golf ball composed of a core of at least one layer, at least one intermediate layer surrounding the core, and at least one cover surrounding the intermediate layer.

* * * * *